US011743105B2

United States Patent
Rao et al.

(10) Patent No.: US 11,743,105 B2
(45) Date of Patent: Aug. 29, 2023

(54) EXTRACTING AND TAGGING TEXT ABOUT NETWORKING ENTITIES FROM HUMAN READABLE TEXTUAL DATA SOURCES AND USING TAGGED TEXT TO BUILD GRAPH OF NODES INCLUDING NETWORKING ENTITIES

(71) Applicant: HEWLETT PACKARD ENTERPRISE DEVELOPMENT LP, Houston, TX (US)

(72) Inventors: Krutarth Rao, Santa Clara, CA (US); Arun Kumar Balasubramani, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 293 days.

(21) Appl. No.: 16/430,353

(22) Filed: Jun. 3, 2019

(65) Prior Publication Data

US 2020/0382359 A1 Dec. 3, 2020

(51) Int. Cl.
*H04L 12/24* (2006.01)
*H04L 41/0604* (2022.01)
*H04L 41/0631* (2022.01)
*H04L 41/12* (2022.01)
*H04L 41/00* (2022.01)
(Continued)

(52) U.S. Cl.
CPC ........ *H04L 41/0604* (2013.01); *G06F 40/242* (2020.01); *G06F 40/284* (2020.01); *H04L 41/0631* (2013.01); *H04L 41/12* (2013.01); *H04L 41/14* (2013.01); *H04L 41/20* (2013.01)

(58) Field of Classification Search
CPC ........ G06N 5/003; G06N 5/022; G06N 99/00; G06N 20/00; H04L 51/02; H04L 41/12; H04L 63/20; G06F 3/121; G06F 40/242; G06F 16/9535; G06F 16/634;
(Continued)

(56) References Cited

U.S. PATENT DOCUMENTS 7,310,625 B2 12/2007 Wu
9,767,197 B1 * 9/2017 Agarwal ............... G06F 16/951
(Continued)

OTHER PUBLICATIONS

Andy Extance, "AI Tame the Scientific Literature", Springer Nature Limited, vol. 561, Sep. 13, 2018, Correction Oct. 5, 2018, pp. 273-274.
(Continued)

*Primary Examiner* — Dustin Nguyen
(74) *Attorney, Agent, or Firm* — Sheppard Mullin Richter & Hampton LLP (57) ABSTRACT

Some implementations of the disclosure are directed to extracting text about networking entities from textual networking data sources, the textual networking data sources including human readable textual data sources; using natural language processing to tokenize the extracted data to obtain tagged data including networking entities and intents; and filtering out from the extracted data, using at least a dictionary of networking terms, data unrelated to networking troubleshooting. Further implementations are directed to building a graph using at least the tagged data including the networking entities and intents, where the graph includes a plurality of nodes and a plurality of links, where each of the plurality of nodes includes a networking entity.

20 Claims, 8 Drawing Sheets

(51) Int. Cl.
*H04L 41/14* (2022.01)
*G06F 40/242* (2020.01)
*G06F 40/284* (2020.01)

(58) Field of Classification Search
CPC ........... G06F 16/3329; G06F 16/24578; G06F 3/167; G06F 16/951; G06F 16/345
See application file for complete search history.

(56) References Cited

U.S. PATENT DOCUMENTS

| | | | |
|---|---|---|---|
| 10,599,767 B1* | 3/2020 | Mattera | G06F 40/242 |
| 10,791,076 B1* | 9/2020 | Parunashvili | H04L 51/02 |
| 10,949,616 B1* | 3/2021 | Shenoy | G06F 16/9535 |
| 10,970,290 B1* | 4/2021 | Levy | G06F 16/24578 |
| 2008/0294423 A1 | 11/2008 | Castellani et al. | |
| 2015/0271008 A1 | 9/2015 | Jain et al. | |
| 2016/0306691 A1 | 10/2016 | Aneja et al. | |
| 2016/0359872 A1* | 12/2016 | Yadav | H04L 63/20 |
| 2018/0033017 A1* | 2/2018 | Gopalakrishnan Iyer | G06N 5/003 |
| 2018/0364975 A1* | 12/2018 | Kwong | G06F 3/167 |
| 2019/0155944 A1* | 5/2019 | Mahata | G06F 16/345 |
| 2019/0236205 A1* | 8/2019 | Jia | G06F 16/3329 |
| 2019/0306327 A1* | 10/2019 | Matysiak | G06F 3/167 |
| 2020/0081939 A1* | 3/2020 | Subramaniam | G06N 5/022 |
| 2020/0162344 A1* | 5/2020 | Zapponi | H04L 41/12 |
| 2020/0342032 A1* | 10/2020 | Subramaniam | G06N 20/00 |
| 2020/0344185 A1* | 10/2020 | Singaraju | H04L 51/02 |
| 2021/0027182 A1* | 1/2021 | Harris | G06N 99/00 |
| 2021/0334305 A1* | 10/2021 | Thakkar | G06F 16/634 |

OTHER PUBLICATIONS

Botta et al., "Finding Network Communities Using Modularity Density", Journal of Statistical Mechanics: Theory and Experiment, vol. 2016, Dec. 20, 2016, pp. 1-33.

Connelly et al., "Datamining a Medieval Medical Text Reveals Patterns in Ingredient Choice that Reflect Biological Activity Against the Causative Agents of Specified Infections", Quantitative Methods; Social and Information Networks; Physics and Society, Jul. 18, 2018, pp. 1-27.

Mercian et al., "Aruba Network Analytics Engine: Troubleshooting with Intelligent Network Insights in HPE Aruba's Switch OS-CX", 2018, 2 pages.

Rozaki, E., Design and Implementation for Automated Network Troubleshooting Using Data Mining, (Research Paper), International Journal of Data Mining & Knowledge Management Process (IJDKP), May 2015, vol. 5, No. 3., 19 Pgs.

* cited by examiner

EXTRACTING AND TAGGING TEXT ABOUT NETWORKING ENTITIES FROM HUMAN READABLE TEXTUAL DATA SOURCES AND USING TAGGED TEXT TO BUILD GRAPH OF NODES INCLUDING NETWORKING ENTITIES

DESCRIPTION OF RELATED ART

Network engineers may face challenges when managing and maintaining the networks they operate. These challenges may range from delivering new capabilities to ensuring the network is always available to support their business. Addressing the demands of high availability may require better visibility and tools for troubleshooting, root cause analysis, and diagnostics.

Networking troubleshooting tools exist to improve automation in network troubleshooting. Many present approaches rely on data generated by the network to provide troubleshooting. Some present network troubleshooting tools may require the user to install custom software on a limited range of devices. For example, some present approaches allow users to write scripts that track networking parameters over time and generate alerts based on the tracked parameters.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

The figures are not intended to be exhaustive or to limit various embodiments to the precise form disclosed. It should be understood that various embodiments can be practiced with modification and alteration.

DETAILED DESCRIPTION

As used herein, the terms "networking entity," "network entity," or variations thereof refer to a networking protocol or an operating characteristic of a network (e.g., operating characteristic of networking protocol or device) that may be monitored through one or more metrics. For example, a networking entity may refer to central processing unit (CPU) usage, a packet drop rate, a fan speed, a Voice over Internet Protocol (VoIP) mean opinion score (MOS) on an Internet protocol service level agreement (IPSLA) session, a Border Gateway Protocol (BGP) neighbor's route cost, memory usage, Control Plane Policing (CoPP) stats, Access Control Lists (ACL) counts, CPU temperature, a number of networking devices, etc.

As used herein, the terms "networking intent," "network intent" or variations thereof refer to a type of relationship between two or more networking entities. For example, a networking intent may refer to a networking entity causing another networking entity to occur, a networking entity being caused by another networking entity to occur, a networking entity occurring together with another networking entity, a networking entity resolving another networking entity, etc.

As used herein, the term "NAE agent," "network analytics engine agent," or variations thereof refers to an instance of a script that may be run to monitor a network.

As noted above, some present approaches for network troubleshooting allow users to write custom scripts that track networking parameters over time and generate alerts based on the tracked parameters. For example, a multitude of scripts may be written (e.g., in the PYTHON scripting language) and uploaded to a network troubleshooting engine that tracks a multitude of networking entities (e.g., dropped packet rate, CPU usage, etc.) and generate alerts based on thresholds. However, such approaches to network troubleshooting and analysis have their limits.

First, such approaches may require expertise in the scripting language in order to generate the desired network tracking results. Although a networking administrator may have a lot of domain knowledge (e.g., knowledge acquired from written manuals, guides, discussion forums, etc.), the networking administrator may not be an experienced programmer. As such, there may be reliance on a third party to create the necessary scripts to track the networking entity of interest. Further, even if the network administrator has some experience in the scripting language that is used to track the networking entities of interest, the network administrator may not have the time to write the script and/or the network administrator may not be familiar with the network analytics scripting application programming interface (API) that is needed to create the necessary script.

A second limitation with such approaches is that there is a limit to the number of network entities that may be tracked at a time. An entire database of network entities may not be trackable at once due to limits in storage and/or processing resources. As such, a network administrator may only have the option of tracking a small subset of networking entities at once (e.g., by running a subset of scripts). If the right networking entities are not being tracked when networking issues are detected, the root cause of the networking issues may not be determined.

A third limitation with such approaches is that some monitoring and analysis platforms are often oblivious to relationships that exist between monitored metrics. This may limit the range of automated troubleshooting capabilities such platforms can provide.

Implementations of the disclosure are directed to addressing these and other limitations that arise in some conventional approaches of network troubleshooting and analysis. In accordance with implementations described herein, a network analytics engine (NAE) may carry out automated network debugging and analysis based on a graph of learned relationships between networking entities. In accordance with implementations further described below, data mining and natural language processing (NLP) techniques may be used to extract textual data from networking data sources and identify relationships between networking entities. Using the identified relationships, a graph of entity relationships may be developed. In some implementations, the graph of networking entity relationships may be created using a cloud-based application. The created graph may be used by a NAE to create debugging paths and make decisions on monitoring key networking entities (e.g., key network operating characteristics) when identifying the source of a networking abnormality. By virtue of developing a node graph that maps relationships between networking entities, a NAE application may dynamically enable and disable scripts to monitor the most appropriate networking entities and thresholds. In this manner, a network administrator may not be required to pick and choose what scripts to run at a given time. Further, by virtue of developing a graph, previously unknown or unrecognized relationships that exist between networking entities may be discovered.

Figure 1:
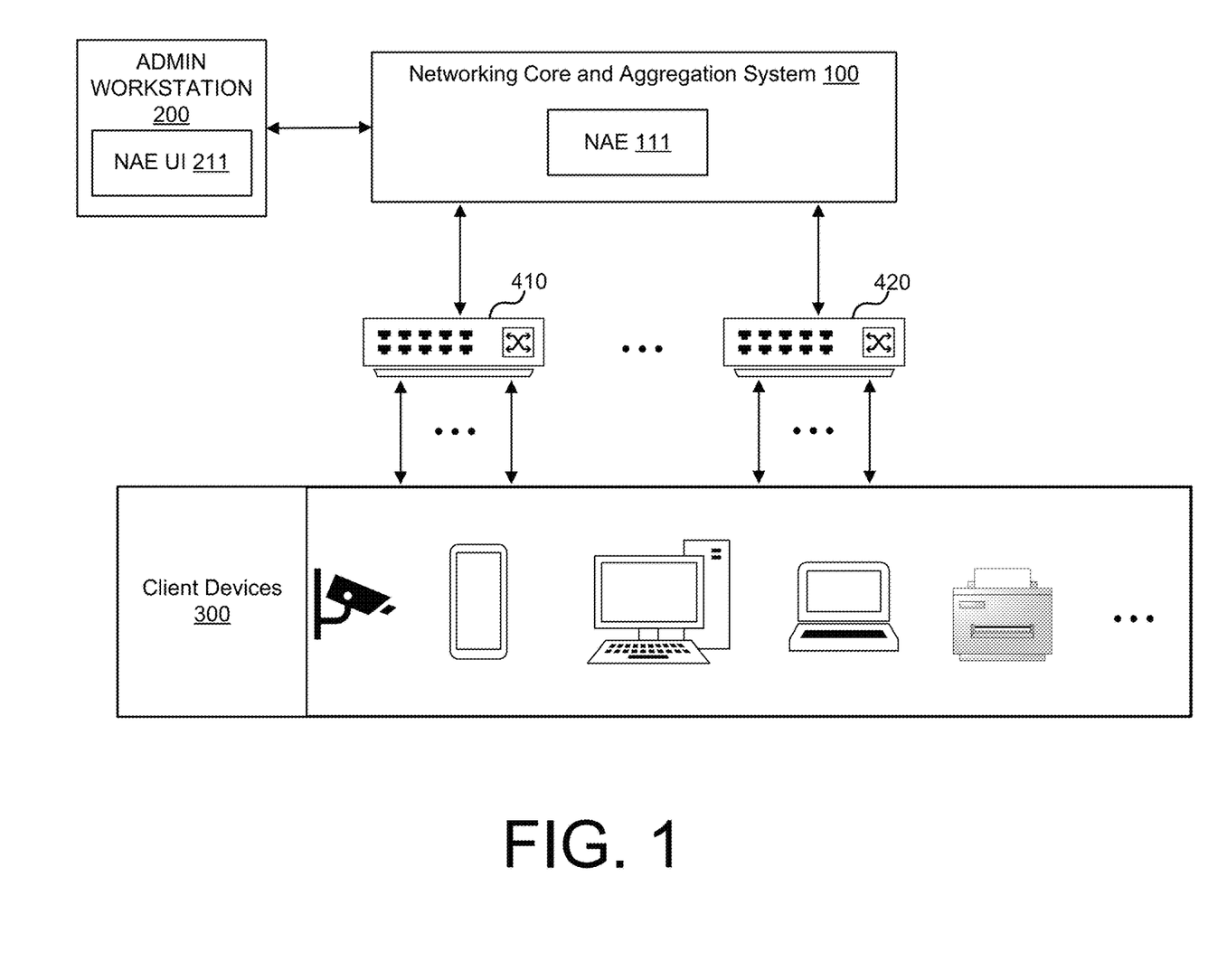
FIG. 1 illustrates an example campus network in which the disclosed technology may be implemented.

FIG. 1 illustrates an example campus network in which the disclosed technology may be implemented. The campus network may be implemented as a single local area network (LAN) or set of interconnected LANs that serve a corporation, a university, a government agency, or other organization. The network may serve a single building or multiple buildings that are in proximity. Although the example of FIG. 1 illustrates a campus network, it should be appreciated that implementations described herein may be implemented in other type of networks in which it would be advantageous to implement automated network debugging based on relationships between networking entities. For example, the technology disclosed herein may be implemented in wide area networks (WANs), home networks, and the like.

In the example of FIG. 1, client devices 300 generate and/or receive network traffic that is routed through access switches 410 and 420 that provide access to the campus network. Although two access switches 410 and 420 are illustrated in this example, it should be appreciated that the campus network may have more than two access switches or a single access switch. A client device 300 may be any networked device (e.g., workstation, mobile device such as laptops, tablets, or smartphones, IP camera, printer, etc.) that generates traffic on the campus network.

As illustrated in the example campus network of FIG. 1, a networking core and aggregation system 100 connects to access switches 410-420. Networking core and aggregation system 100 may provide functions such as networking management, high performance layer 2 switching, layer 3 services, layer 3 routing, security, and other functions. As used herein, "layer 2" and "layer 3" correspond to the data link layer and the network layer in the Open Systems Interconnection model (OSI model) respectively. In implementations, the networking core and aggregation system 100 may be implemented as a campus core and aggregation switch.

In the example of FIG. 1, networking core and aggregation system 100 runs a network analytics engine (NAE) 111, further described below, that monitors network traffic and provides root cause analysis of networking problems using learned relationships between networking entities. For example, the NAE 111 may provide monitoring of the health of network switches, network analytics at layers 1-3 of the Open System Interconnection (OSI) model, or application traffic. In implementations, further described below, NAE 111 may leverage a graph of learned relationships between network entities to rapidly and automatically determine root causes of network problems.

In some implementations, access switches 410-420 may be configured to run a NAE 111 as an alternative to or in addition to networking core and aggregation system. More generally, it should be appreciated that the NAE described herein may run on any device that may be configured to receive network traffic from networking devices and perform automated network troubleshooting based on a graph of learned relationships between networking entities. For example, the NAE 111 may be implemented in a router, gateway, or other suitable networking device.

A network administrator may access, configure, and/or monitor NAE 111 through an administrator workstation 200 (e.g., laptop, desktop, tablet, smartphone, etc.) that is communicatively coupled to networking core and aggregation system 100. The administrator workstation 200 may present a NAE user interface (UI) 211. For example, in implementations where NAE UI 211 is a web-based UI, administrator workstation 200 may access the NAE 111 through a web browser installed on admin workstation 200. Other suitable interfaces (e.g., command line interface) may be used to access, configure, and/or monitor NAE 111. For example, a native NAE application may run on administrator workstation 200 and/or a cloud-based NAE application may be accessed by administrator workstation 200.

Figure 2:
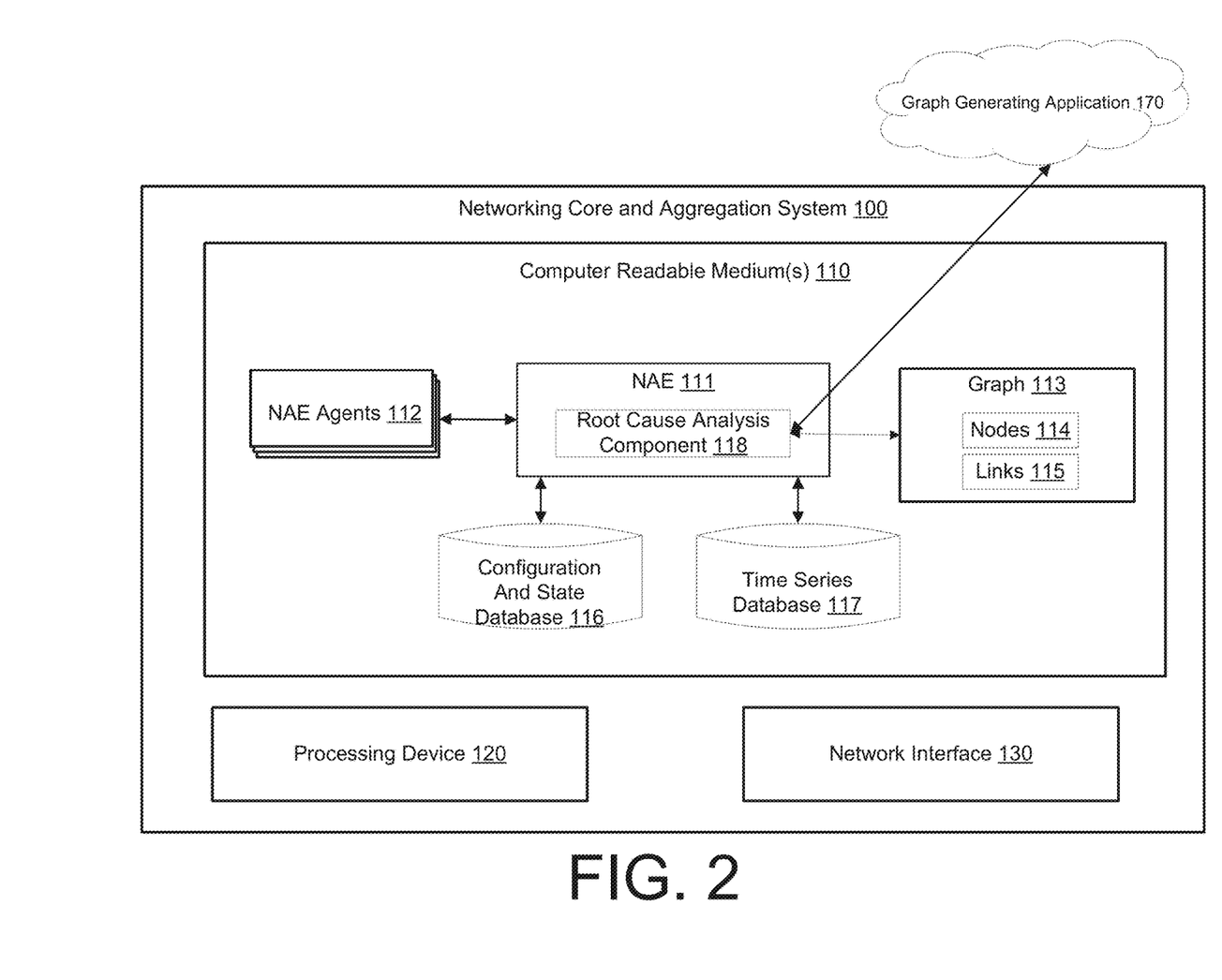
FIG. 2 is a schematic block diagram illustrating one example of components of a networking core and aggregation system, including a NAE, in accordance with implementations of the disclosure.

FIG. 2 is a schematic block diagram illustrating one example of components of a networking core and aggregation system 100, in accordance with implementations of the disclosure. As illustrated, networking core and aggregation system 100 may include one or more computer readable mediums 110, a processing device 120 (e.g., a processor to execute machine readable instructions such as instructions of a NAE 111 and/or NAE agents 112), and a network interface 330 to communicate with other network devices, including switches 410-420 and administrator workstation 200. Some non-limiting examples of communication methods that may be implemented by networked devices in accordance with the disclosure may include wired communications methods, such as cable, fiber-optic, or DSL; or wireless communications methods, such as Wi-Fi, cellular communications, or satellite communications, or some combination thereof.

As illustrated, networking core and aggregation system may be configured to run a NAE 111 that includes a root cause analysis (RCA) component 118 for assisting network administrators in finding the root cause of network problems. The NAE 111 may call one or more NAE agents 112 that monitor one or more networking entities at a time. For example, NAE agents 112 may monitor the health of switches 410-420, network analytics at Layers 1-3 of the network, or application traffic from client devices 300.

Each NAE agent 112 may be implemented by running an instance of a script that monitors for and triggers on network anomalies. For example, the NAE 111 may accept a script and provide a runtime environment through a NAE agent 112 for an instance of a script's instructions to execute. In some implementations, multiple agents may run an instance of the same script (e.g., execute the same code), but with different monitoring thresholds. For example, the actions specified in a script may be run multiple times, once by each NAE agent. In some implementations, only a single NAE agent 112 may run an instance of a script.

Each script may monitor one or more networking entities, including thresholds associated with those networking entities, and take actions based on the monitored threshold. An example of a network entity threshold may be a high hit count on an access control list, which may trigger an action to generate an alert and create a Syslog message or a custom report. Network administrators (e.g., user of workstation 200) may combine multiple actions into workflows to perform selective diagnostics and/or recommendations. In implementations, each NAE script may be programmed by the network administrator, downloaded from a script portal or hub, or some combination thereof.

The data gathered using NAE agents 112 may be used provide context surrounding network problems or anomalies, and used by root cause analysis component 118 to determine the root causes of networking problems. For example, increased latency due to congestion or packet drops may cause poor VoIP quality. However, component 118 may be used to determine that the root cause of the problem is at the physical layer (e.g., a bad cable), a link state issue at Layers 2 or 3, or a maximum transmission unit (MTU) misconfiguration. As another example, component 118 may be used to determine that connection difficulties to a network or peripherals are due to any of the above causes cited in the prior example or an internet service provider (ISP) service failure. As a further example, component 118 may be used to determine that application access issues into email or cloud systems are due to problems with dynamic host configuration protocol (DHCP) reachability, or simply due to configuration errors. As yet a further example, root cause analysis component 118 may be used to determine that a spike in VoIP packets was caused by bulk traffic that was incorrectly marked with a VoIP differentiated services code point (DSCP) value. In some implementations, the NAE 111 may automatically resolve a detected root cause of a networking problem or provide a network administrator with information regarding the cause to allow the network administrator to solve the problem.

The configuration and state database 116 may provide NAE agents 112 with access to configuration, protocol state, and/or network statistics. For example, these parameters may be fully exposed through Representational State Transfer (REST) application programming interfaces (APIs). The time series database 117 may contain relevant historical data correlated with network configuration changes. This historical data may provide network administrators with the ability to capture and archive network context surrounding network events involving network entities.

As discussed above, one of the limitations of some present systems for automated network troubleshooting is that there is a limit to the number of networking entities that may be monitored before a bottleneck in processing or memory resources is reached. As such, while NAE 111 would ideally run any number of NAE agents 112 at once, at some point the networking core and aggregation system 100 may reach a limit as to the number of scripts that are running at once. To address this problem, implementations of the disclosure are directed to using the root cause analysis component 118 to leverage learned relationships of NAE agent scripts and networking entities to dynamically enable or disable NAE agents 112 to more intelligently determine the root cause of a problem in the network.

To this end, NAE 111 may utilize RCA component 118 to leverage a graph 113 of learned relationships between networking entities. In some implementations, the graph 113 may be implemented as a graph database. However, it should be appreciated that other suitable graph file structures may be utilized. As further described below, the graph 113 may be created using a graph received over a network (e.g., using network interface 130) as an input by RCA component 118 from a cloud-based, graph generating application 170 that crunches textual networking data sources to learn relationships between networking entities.

The graph may include a plurality of vertices or nodes 114 and a plurality of edges or links 115 that connect the nodes to form a graph. In some implementations, further described below, the graph 113 may be traversed to quickly identify the correct networking entities to monitor at a given time and enable or disable the appropriate NAE agents 112. In implementations, each node 114 may represent a networking entity. For example, a node may represent a networking protocol or an operating characteristic of a networking device or protocol. As such, each link 115 may represent a relationship from one networking entity node to another networking entity node. Each link 115 may have an associated numerical value property, called a weight, that provides a measure of the strength of the relationship between two nodes. As such, the graph 113 may provide a mapping of learned relationships of networking entities.

Figure 3:
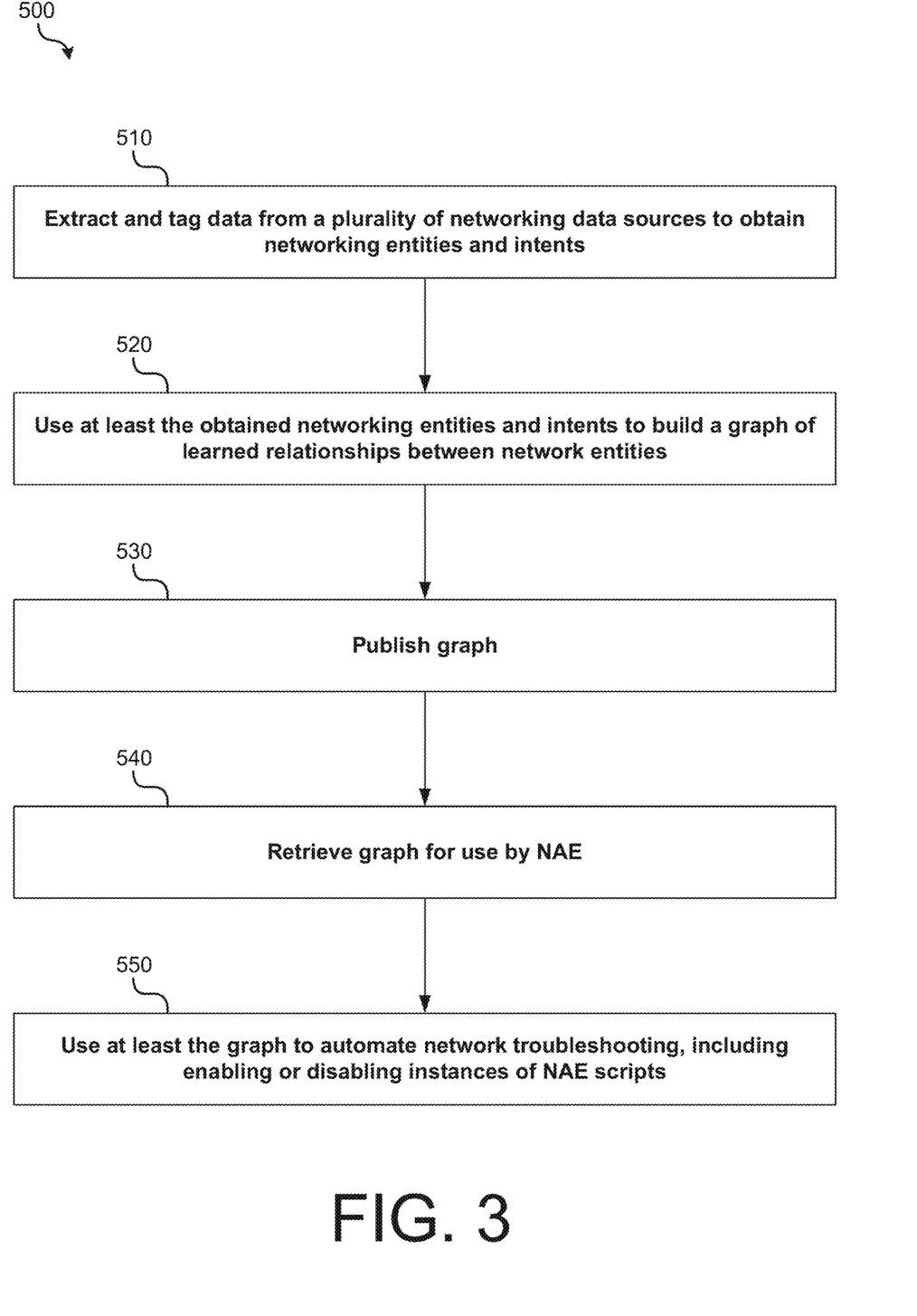
FIG. 3 is an operational flow diagram illustrating an example method in accordance with implementations of the disclosure.

FIG. 3 is an operational flow diagram illustrating an example method 500 in accordance with implementations of the disclosure. Prior to using a graph 113 for automated network troubleshooting, including enabling and disabling agents, relationships between networking entities and/or intents may need to be learned. To this end, at operation 510, data may be extracted and tagged from a plurality of textual networking data sources to obtain networking entities and intents. Particular implementations of operation 510 are further described below with reference to FIG. 4. Following data extraction, at operation 520, the obtained networking entities and intents may be used to build a graph of learned relationships between networking entities. Particular implementations of operation 520 are further described below with reference to FIG. 5.

In various implementations, operations 510-520 may be implemented using a cloud-based platform. For example, a cloud-based, graph generating application 170 as described above may be used to generate the graph. In such implementations, the generated graph may be published at operation 530. At operation 540, the published graph may be retrieved for use by a NAE 111 of a networking device that automates troubleshooting based on learned relationships between networking entities. For example, a root cause analysis component 118 of a NAE 111 may retrieve the published graph from the cloud for automated network troubleshooting as discussed above. Depending on the implementation, the retrieved graph may be modified (e.g., modified to a suitable file structure, modified to contain thresholds, etc.) or used as is.

Figure 6:
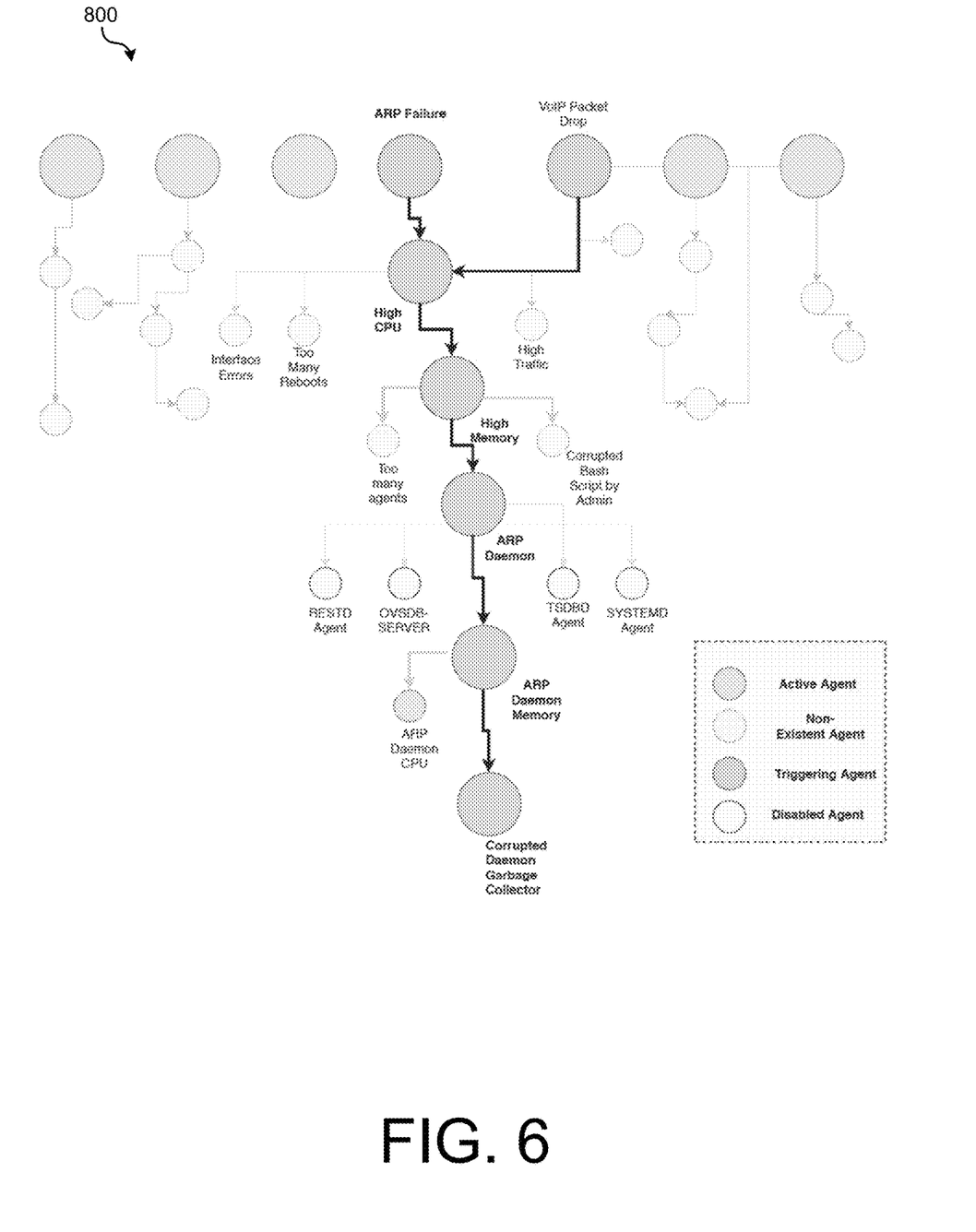
FIG. 6 shows one example root cause analysis workflow that may be implemented in accordance with implementations of the disclosure.

Following retrieval of the graph, at operation 550 the graph may be used to automate networking troubleshooting as described above. For example, root cause analysis component 118 may use a graph 113 to dynamically enable and/or disable NAE agents as network triggering conditions are detected. By way of illustration, FIG. 6 shows a root cause analysis workflow 800 that may be implemented in one example. As shown in this example, as networking conditions pertaining to networking entities are detected, NAE agents that monitor related networking entities may be dynamically enabled based on the relationships mapped between networking entity nodes in the graph. Beginning with a triggered root node, children nodes (e.g., nodes one link removed) may be triggered, and the process may iterate until a root cause of a networking problem is found. For instance, consider the case of FIG. 6 where Address Resolution Protocol (ARP) failure and VoIP packet drop (e.g., above a certain threshold) issues are occurring due to a switch being under stress. In this case NAE agents that detect the ARP failure and VoIP packet drop may cause a high CPU monitoring NAE agent to be triggered. This process may continue (e.g., high CPU monitoring NAE agent triggers high memory usage monitoring NAE agent, etc.) until a NAE agent that monitors a garbage collector daemon thread is triggered and detects a corruption.

Figure 4:
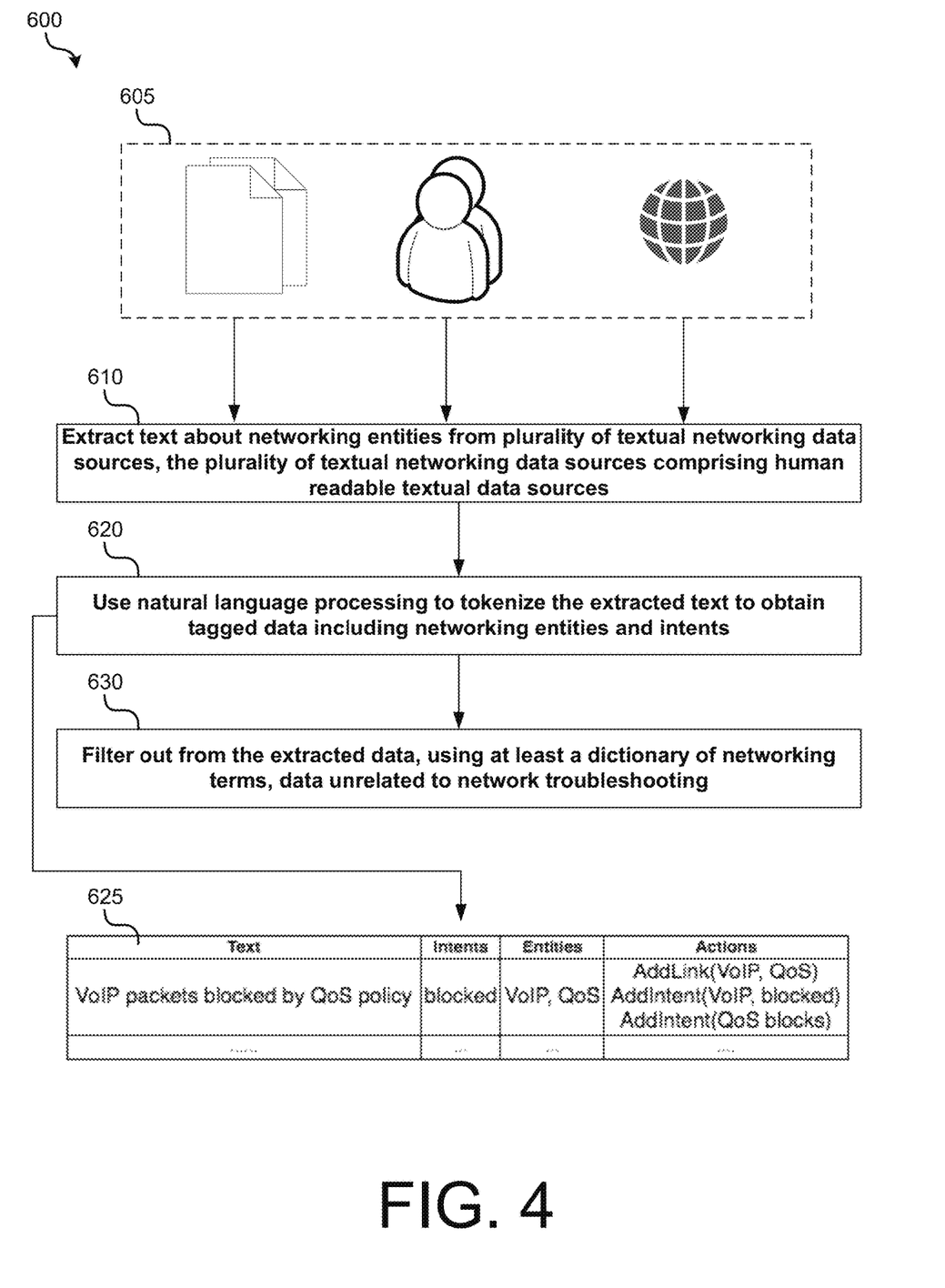
FIG. 4 is an operational flow diagram illustrating an example method of extracting and tagging networking entity and intent data retrieved from textual networking data sources, in accordance with implementations of the disclosure.

FIG. 4 is an operational flow diagram illustrating an example method 600 of extracting and tagging networking entity and intent data retrieved from textual networking data sources, in accordance with implementations of the disclosure. In some implementations, some or all operations of method 600 may be implemented by a processor of a computing system executing one or more instructions stored in a computer readable medium.

As noted above, some network monitoring and analysis platforms are often oblivious to relationships that exist between monitored network metrics, which limits the range of automated troubleshooting capabilities such platforms can provide. For example, human-readable textual knowledge resources such as community resources such as expert blogs and user targeted troubleshooting resources, which are often overlooked, may provide the above-mentioned relationships to the user through textual formats. Implementations of the disclosure are directed to a framework for leveraging the multitude of textual data to develop an intelligent debugging mechanism as described above. By virtue of doing so, human readable knowledge may be converted to machine readable models for automated network debugging.

Referring now to method 600, at operation 610, text about networking entities is extracted from a plurality of textual networking data sources 605. The plurality of textual networking data sources 605 may comprise human readable (e.g., English natural language) textual data sources. For example, textual networking data sources 605 may include online community responses, message boards, networking manuals or guides, network operating system (NOS) schema, or any other textual data sources known to contain networking entities and potential relationships outlined in a human-readable language (e.g., English). By way of example, a networking article that describes the open shortest path first (OSPF) routing protocol may make frequent reference to the Internet Protocol (IP). As another example, a user post on a community forum that discusses the DHCP may refer to the User Datagram Protocol (UDP), IP addresses, etc. As a further example, tutorials and troubleshooting guides posted by a business that manufactures networking hardware may frequently reference interrelated networking devices, networking protocols, and/or networking operational characteristics.

At operation 620, natural language processing (NLP) may be used to tokenize the extracted text to obtain tagged data including networking entities and intents. Any suitable NLP library trained on the English language to extract networking entities in the form of nouns and networking intents in the form of verbs may be utilized. For example, in some implementations the Natural Language Toolkit (NLTK) or Stanford core NLP may be utilized to extract networking entities and intents from English sentences.

In some implementations, the tagged data may be utilized to populate a table. Each row of the table may be based on text extracted from a sentence or article, and it may include a field for networking intents, a field for networking entities associated with the networking intents, and a field for actions to be taken with respect to a graph (e.g., a graph database) based on the networking intents and entities that were extracted. By way of illustrative example, table 625 illustrates example tagged data that may be generated at operation 620. As illustrated in this example, NLP is used to tokenize the text "VoIP packets blocked by QoS policy" to obtain tagged data including networking entities and intents from the extracted data. In this example, the extracted networking intents includes the verb "blocked" and the extracted networking entities include the terms VoIP and QoS (i.e., quality of service). As illustrated, the actions to be taken with respect to the graph, further described below, include adding a node graph link between VoIP and QoS, adding a node graph link of intent type "blocked" to VoIP, or adding a node graph link of intent type "blocked" to QoS.

It should be noted that in the illustrated example of table 625, a wide net is being cast to avoid omitting relevant data. For example, although the word "blocked" is mentioned, because it is not clear to the NLP in this example whether the word blocked is referring to VoIP or QoS networking entities, in this example it is assumed that the word blocked is related to both entities (i.e., these entities relate to things being blocked). During subsequent creation of the node graph, further described below, these relationships may be further tuned.

At operation 630, using at least a dictionary of networking terms, data unrelated to network troubleshooting may be filtered out. For example, a dictionary of key networking terms (e.g., networking protocols or operational characteristics) may be utilized to filter out irrelevant data that has been identified as being a networking entity or intent by the natural language processor.

Figure 5:
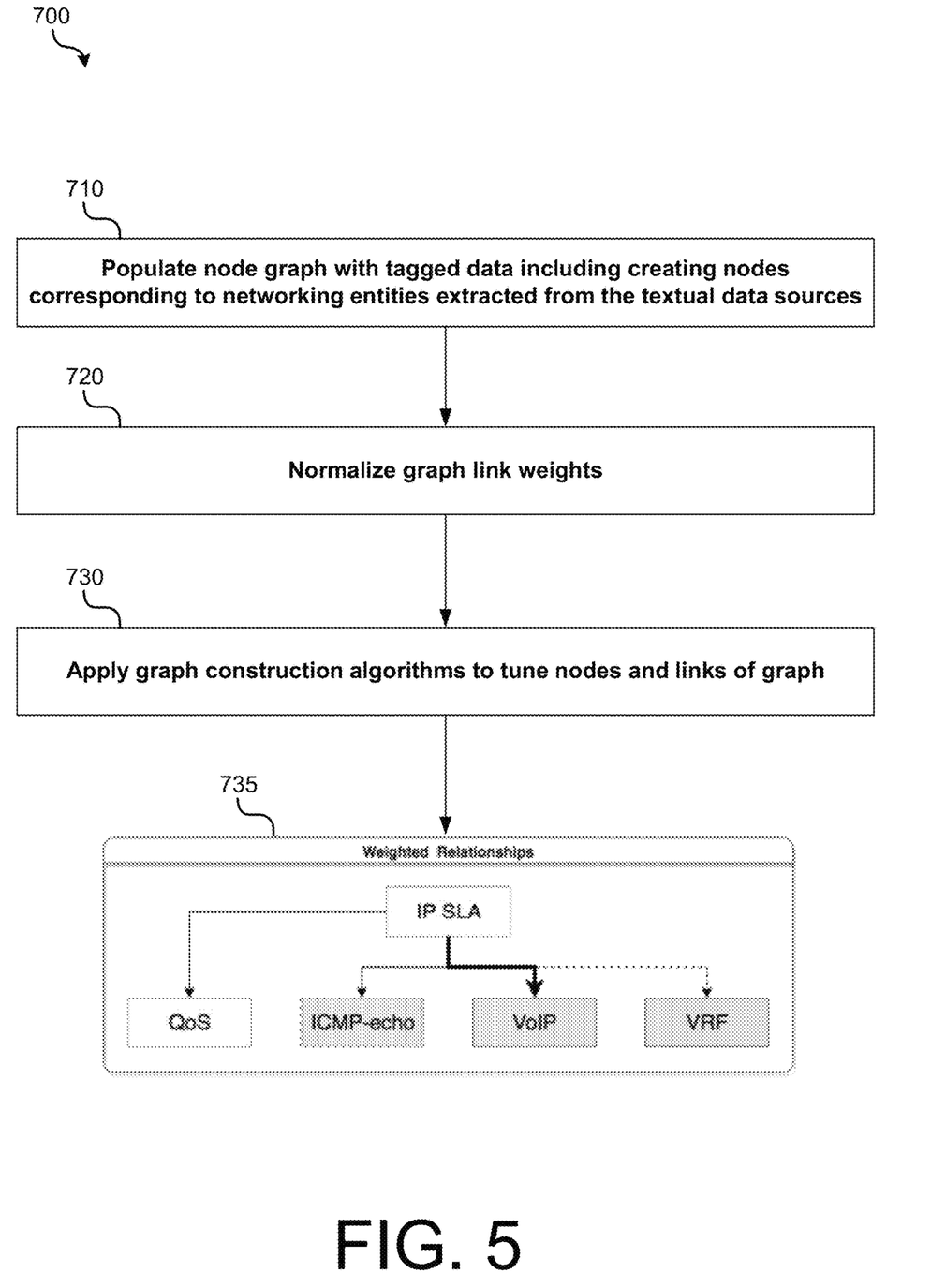
FIG. 5 is an operational flow diagram illustrating an example method for using networking entity and intent data extracted from textual data sources to build a graph, in accordance with implementations of the disclosure.

FIG. 5 is an operational flow diagram illustrating an example method 700 for using networking entity and intent data extracted from textual data sources to build a graph, in accordance with implementations of the disclosure. For example, method 700 may be implemented after each iteration of a method 600. In some implementations, some or all operations of method 700 may be implemented by a processor of a computing system executing one or more instructions stored in a computer readable medium.

At operation 710, a graph is populated with tagged data, including creating nodes corresponding to networking entities extracted from the textual data sources. The tagged data, including networking entities and intents that is obtained during method 600, may be used to convert the extracted text to a graph representation. To this end, a table created during networking entity and intent extraction (e.g. table 625) may provide a basis of input to graph construction algorithms that use action item fields to establish links between nodes including identified networking entities and networking sub-entities. For example, one networking entity may be an IP service level agreement (IP SLA) with the sub-entity consisting of the metric used to monitor the status of the entity (i.e., an IP SLA sessions' fields). For instance, the average round-trip time (RTT), a metric measured by an SLA session, may be a sub-entity.

In implementations, the action item fields may be used to establish links based on static rules and co-occurrence of networking entities. For example, action item fields may be set on static rules that add a link or increase the link weight between two networking entities that occur in the same sentence. As another example, action item fields may be set on static rules that add a link or increase the link weight between two networking entities that occur in the same article. As a further example, action item fields may be set on static rules that add a link or increase the link weight between two networking entities that a user has specified as a related. As a further example, action item fields may be set on a static rule that adds a sub-entity to entity links between two entities where a sub-entity is detected.

Once an initial graph has been populated (e.g., based on co-occurrence of networking entities at the sentence and article level), the weights between links, the links themselves, and/or the nodes may be tuned to further refine the relationships, including filtering out weak and/or irrelevant relationships. To this end, operations 720-730 may be performed.

At operation 720, the link weights between networking entities of the graph may be normalized. Any suitable link weight normalization algorithm may be utilized. For example, a linear transformation, min-max scaling, standard scaling, z-factor normalization, or other normalization algorithm may be utilized.

At operation 730, graph construction algorithms may be applied to tune the nodes and links of the graph. These algorithms may be used to filter and/or discover the relationships between nodes. For example, in some implementations, community detection algorithm may be utilized to identify clusters of nodes and combine nodes. For example, community identification algorithms may be utilized to identify the most frequent links between networking entities, including finding central nodes among clusters. Other suitable graph construction algorithms that may be to refine the nodes of the node graph and their associated links may including the Louvain algorithm, modularity maximization, clique-based methods, PageRank, and the like. In some implementations, networking intents may be used to identify links between networking entities.

By way of illustration, sample node graph portion 735 shows relationships between IP SLA and other networking entities after application of community identification. In this example, IP SLA has been identified as a central node, and a link between IP SLA and VRF has been removed as indicated by the dotted arrow.

Figure 7:
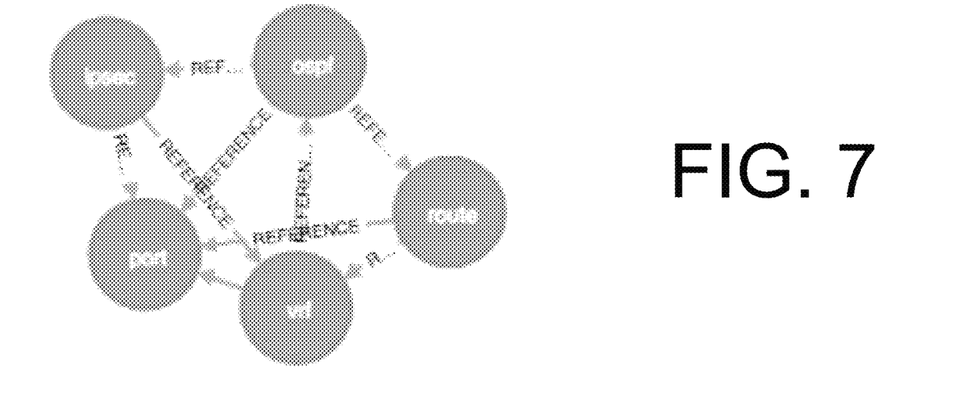
FIG. 7 illustrates a graph representation of table references in an OS schema for the OSPF table.
Figure 8:
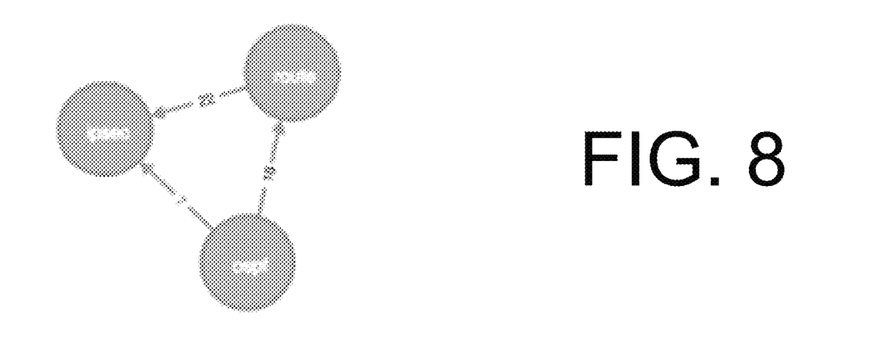
FIG. 8 illustrates some relationships for the OPSF networking entity in a graph created in accordance with implementations of the disclosure.
Figure 9:
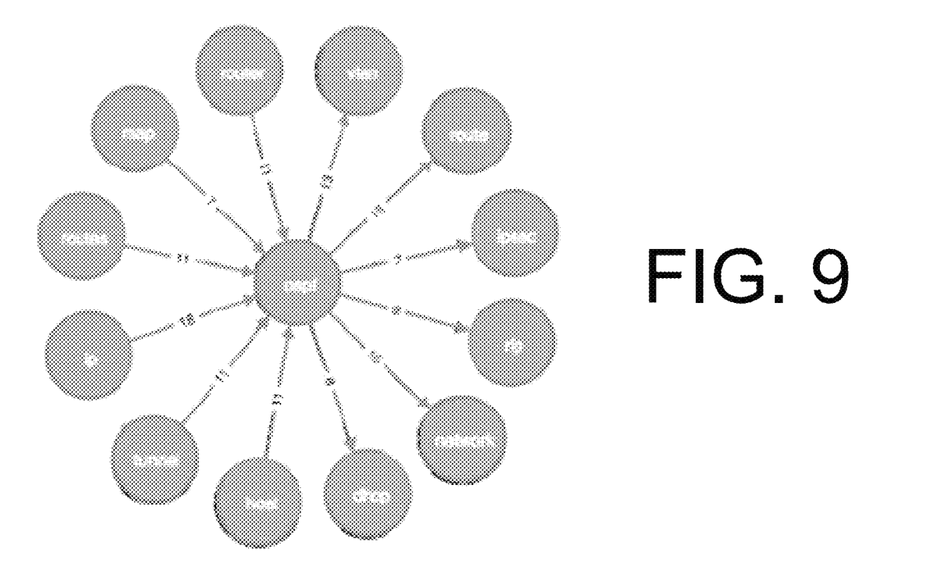
FIG. 9 illustrates a graph, created in accordance with implementations of the disclosure, showing other significant relationships besides those shown in FIG. 8 with the OSPF networking entity as the central node.

To test implementations described herein, a database schema of an operating system containing partial relationships between known networking entities was considered. The schema contains information in the form of table references that provide relationships between daemons. For example, a daemon that facilitates an OSPF protocol may have a reference in its table to a daemon that facilitates an IPSEC protocol. FIG. 7 illustrates a graph representation of table references in the OS schema for the OSPF table. By comparison, FIG. 8 illustrates some relationships for the OPSF networking entity in a graph created in accordance with implementations of the disclosure, and FIG. 9 illustrates a graph, created in accordance with implementations of the disclosure, showing other significant relationships with the OSPF entity as the central node. The graph of FIG. 9 was trained using approximately five thousand articles identifying every table reference extracted from the database schema along with other relationships that could be worth exploring during network interruption. As the foregoing example illustrates, the relationships mapped by following implementations in accordance with the disclosure match what is known by developers (i.e., the OS schema). As the foregoing example further illustrates, by augmenting a NAE 111 with a trained model to create a graph, the NAE 111 may be able to set-up monitoring for new metrics if a preset threshold is passed. The relationship graph may trigger a chain of monitoring events that give the user visibility on metrics the user may not have anticipated to be related.

Figure 10:
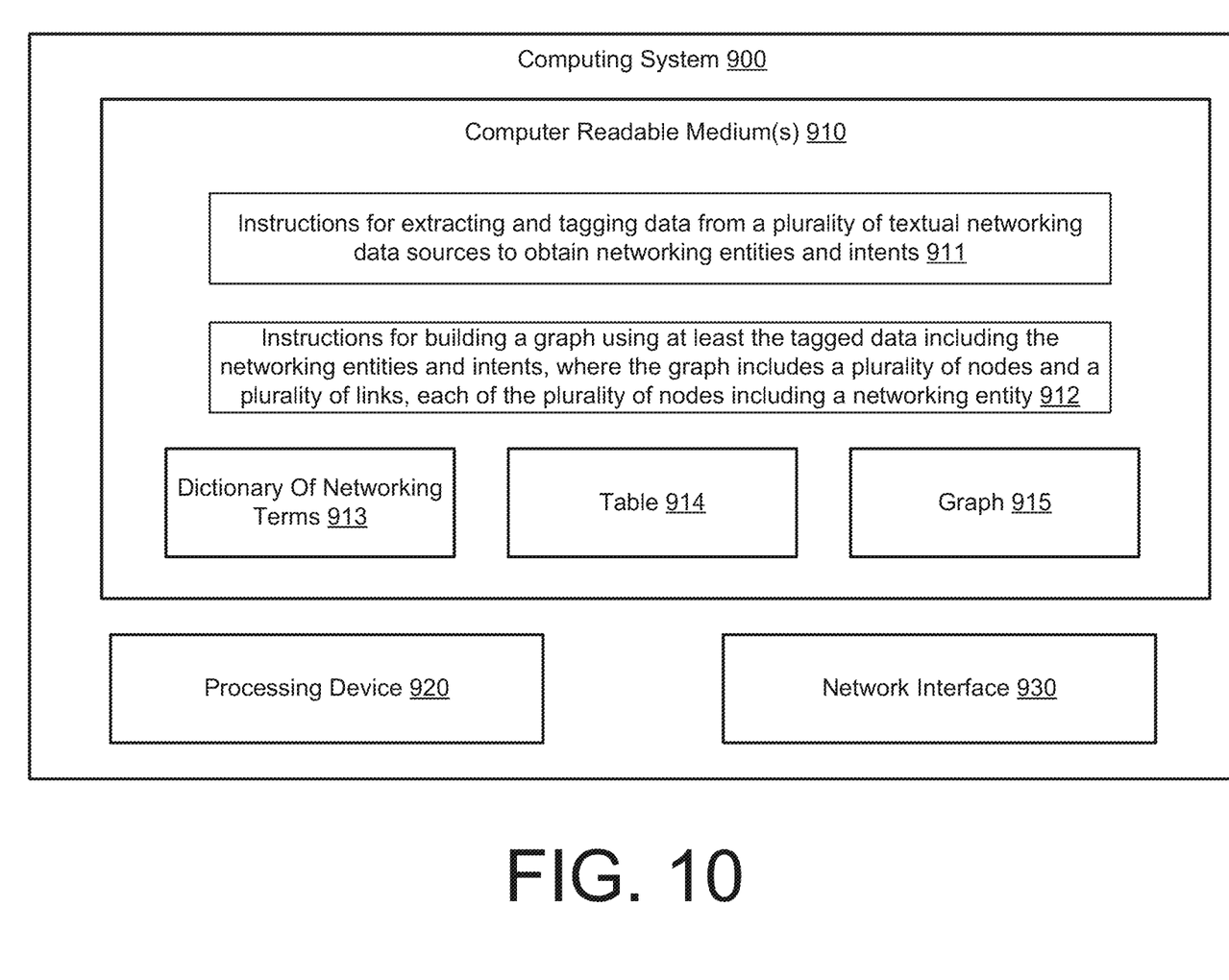
FIG. 10 is a schematic block diagram illustrating one example of components of a computing system that may be implemented on the cloud to generate graphs of learned relationships between networking entities, in accordance with implementations of the disclosure.

FIG. 10 is a schematic block diagram illustrating one example of components of a computing system 900 that may be implemented on the cloud to generate graphs of learned relationships between networking entities, in accordance with implementations of the disclosure. For example, computing system 900 may implement cloud-based, graph generating application 170. As illustrated, computing system 900 may include one or more computer readable mediums 910, a processing device 920, and a network interface 930 to communicate with other network devices. Computer readable medium 910 may store instructions 911 that when executed by processing device 920, extract and tag networking entity and intent data retrieved from textual networking data sources. For example, instructions 911 may be executed to implement operations 610-630 of method 600. Computer readable medium(s) 910 may further store instructions 912 that when executed by processing device 920, build a graph using at least the tagged data including the networking entities and intents, where the graph includes a plurality of nodes and a plurality of links, each of the plurality of nodes including a networking entity. For example, instructions 912 may be executed to implement method 700. Computer readable medium(s) 910 may further store a dictionary of networking terms 913 that may be used to filter out data during operation 630. Computer readable medium(s) 910 may further store a table 914 that may be created from extracted text as describe above with reference to operations 620-630. Computer readable medium(s) 910 may further store a graph 915 that may be created in accordance with method 700 described above. The system 900 may make the graph 915 available for retrieval over a cloud network.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer-readable medium having executable instructions stored, that when executed by a processor, performs operations of:
    extracting text about relationships of a plurality of networking entities from a plurality of textual networking data sources, the plurality of textual networking data sources comprising human readable textual data sources;
    obtaining tagged data by tokenizing the extracted text based on natural language processing, wherein the tagged data includes the plurality of networking entities and intents;
    removing from the extracted text, using at least a dictionary of networking terms, data unrelated to networking troubleshooting;
    building and populating a node graph with the tagged data and without the data unrelated to networking troubleshooting, wherein the building and the populating of the node graph includes creating nodes corresponding to networking entities extracted from the plurality of textual networking data sources and a plurality of links between the nodes corresponding to networking entities;
    normalizing weights of the plurality of links between the nodes using a link weight normalization algorithm; and
    creating one or more debugging paths to effectuate automated monitoring of the plurality of networking entities using the extracted text about relationships of the plurality of networking entities.

2. The non-transitory computer-readable medium of claim 1, wherein the building and the populating of the node graph is using the networking entities and intents of the tagged data.

3. The non-transitory computer-readable medium of claim 2, wherein the instructions, when executed by the processor, further perform an operation of:
    populating a graph database with the networking entities or intents of the tagged data to form the plurality of nodes and the plurality of links, and forming the plurality of links is based at least on static rules and co-occurrence of networking entities in a sentence or article.

4. The non-transitory computer-readable medium of claim 3, wherein the static rules comprise one or more of the following:
    adding a first link or increasing a first link weight between two networking entities that occur in the sentence;
    adding a second link or increasing a second link weight between two networking entities that occur in the article;
    adding a third link or increasing a third link weight between two networking entities that a user has specified as related; and
    adding a sub-entity to entity links between two entities where a sub-entity is detected.

5. The non-transitory computer-readable medium of claim 1, wherein the instructions when executed by the processor, further perform operations of:
    after normalizing the weights of the plurality of links, apply a graph construction algorithm to tune the plurality of nodes and the plurality of links of the node graph, wherein the graph construction algorithm tunes the nodes and the plurality of links to filter weak or irrelevant relationships between the plurality of nodes.

6. The non-transitory computer-readable medium of claim 2, wherein the instructions when executed by the processor, further perform operations of:

populating a table with the tagged data, including the plurality of networking entities and intents, wherein the table comprises an action field for one or more actions to be taken with respect to building the node graph based on the plurality of networking entities and intents that were extracted; and using the action field to establish links between the nodes including the identified networking entities.

7. A method, comprising:

extracting text about relationships of a plurality of networking entities from a plurality of textual networking data sources, the plurality of textual networking data sources comprising human readable textual data sources;

obtaining tagged data by tokenizing the extracted text based on natural language processing, wherein the tagged data includes the plurality of networking entities and intents;

removing from the extracted text, using at least a dictionary of networking terms, data unrelated to networking troubleshooting;

building and populating a node graph with the tagged data and without the data unrelated to networking troubleshooting, wherein the building and the populating of the node graph includes creating nodes corresponding to networking entities extracted from the plurality of textual networking data sources and a plurality of links between the nodes corresponding to networking entities;

normalizing weights of the plurality of links between the nodes using a link weight normalization algorithm; and creating one or more debugging paths to effectuate automated monitoring of the plurality of networking entities using the extracted text about relationships of the plurality of networking entities.

8. The method of claim 7, wherein the building and the populating of the node graph is using the networking entities and intents of the tagged data.

9. The method of claim 8, further comprising: wherein populating a graph database with the networking entities or intents of the tagged data to form the plurality of nodes and the plurality of links, and forming the plurality of links is based at least on static rules and co-occurrence of networking entities in a sentence or article.

10. The method of claim 7, further comprising:

after normalizing the weights of the plurality of links, apply a graph construction algorithm to tune the plurality of nodes and the plurality of links of the node graph, wherein the graph construction algorithm tunes the nodes and the plurality of links to filter weak or irrelevant relationships between the plurality of nodes.

11. The method of claim 10, wherein the graph construction algorithm comprises a community detection algorithm.

12. The method of claim 7, further comprising:

populating a table with the tagged data, including networking entities and intents, wherein the table comprises an action field for one or more actions to be taken with respect to the graph based on the networking entities and intents that were extracted; and using the action field to establish links between nodes including identified networking entities.

13. A system, comprising:

a memory; and a processor for executing instructions stored on the memory performing operations to:

extract text about relationships of a plurality of networking entities from a plurality of textual networking data sources, the plurality of textual networking data sources comprising human readable textual data sources;

obtain tagged data by tokenizing the extracted text based on natural language processing, wherein the tagged data includes the plurality of networking entities and intents;

remove from the extracted text, using at least a dictionary of networking terms, data unrelated to networking troubleshooting;

build and populate a graph with the tagged data and without the data unrelated to networking troubleshooting, wherein the building and the populating of the graph includes creating nodes corresponding to networking entities extracted from the plurality of textual networking data sources and a plurality of links between the nodes corresponding to networking entities;

normalize weights of the plurality of links between the nodes using a link weight normalization algorithm; and create one or more debugging paths to effectuate automated monitoring of the plurality of networking entities using the extracted text about relationships of the plurality of networking entities.

14. The system of claim 13, wherein the operations are further to enable and disable instances of scripts based at least in part on relationships between the networking entities in the graph comprising the plurality of links linking the nodes.

15. The system of claim 14, wherein the graph is a graph database.

16. The non-transitory computer-readable medium of claim 1, wherein the operations further comprise:

dynamically enabling or disabling a script that monitors the plurality of networking entities, wherein the script monitors for network anomalies or triggers associated with the plurality of networking entities.

17. The non-transitory computer-readable medium of claim 1, wherein the operations further comprise:

receiving an initial computing system definition graph, wherein nodes of the initial computing system definition graph correspond with a plurality of network entities and links of the initial computing system definition graph correspond with actions; and refining the relationships between the plurality of networking entities shown in the initial computing system definition graph by adjusting the initial computing system definition graph by tuning the nodes or the links and to remove the data unrelated to network troubleshooting.

18. The non-transitory computer-readable medium of claim 1, wherein the operations further comprise:

populating a table that stores the plurality of networking entities in a first form of nouns and intents in a second form of verbs, wherein the tagged data includes at least one of the plurality of networking entities in the first form of nouns and the intents in the second form of verbs.

19. The non-transitory computer-readable medium of claim 1, wherein the link weight normalization algorithm comprises a linear transformation algorithm, a min-max scaling algorithm, a scaling algorithm, or a z-factor normalization algorithm.

20. The non-transitory computer-readable medium of claim 1, wherein the automated monitoring of the plurality of networking entities dynamically disables a network analytics engine (NAE) agent as network triggering conditions are detected.

\* \* \* \* \*